July 10, 1962 G. W. SIWINSKI 3,043,666
PURIFICATION OF HYDROGEN PEROXIDE
Filed March 11, 1960
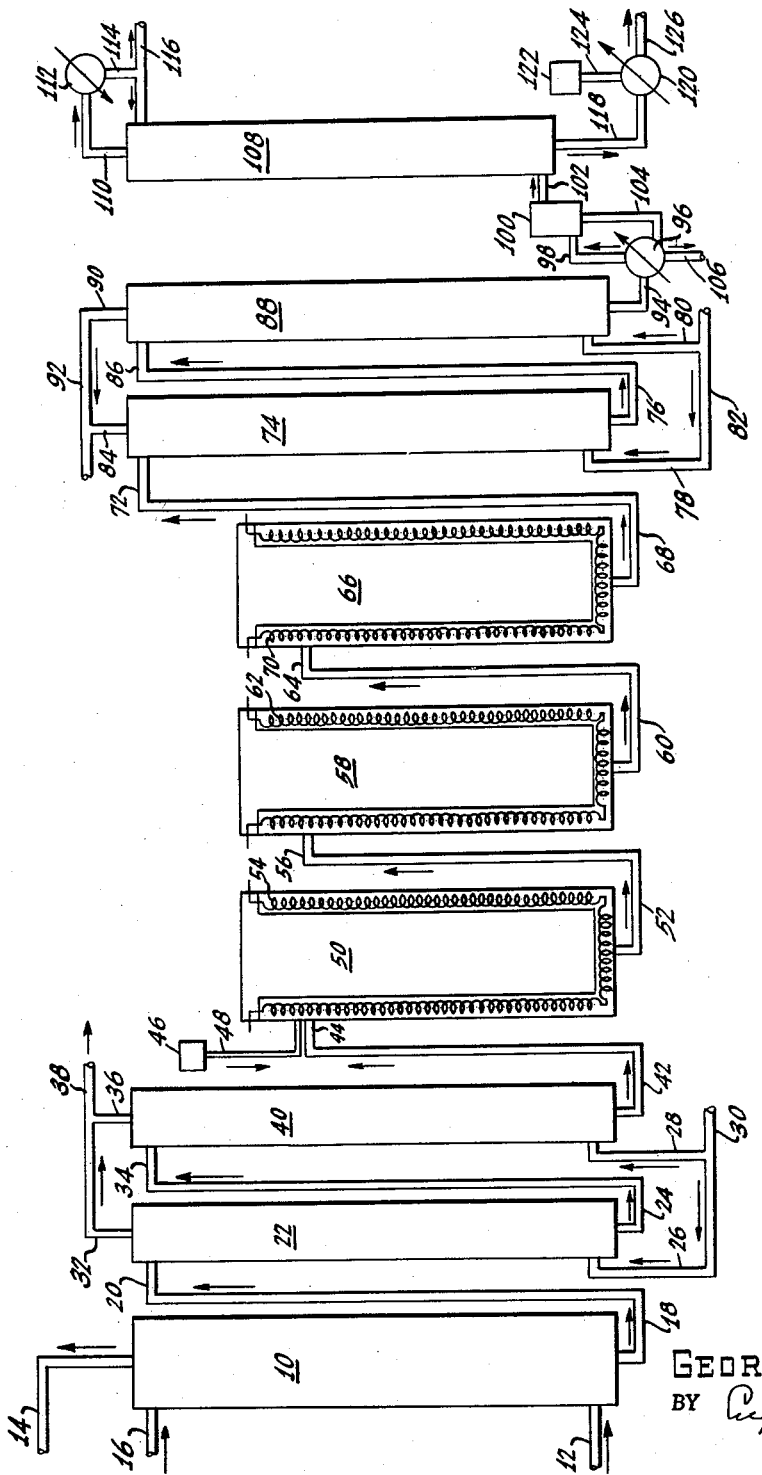
INVENTOR.
GEORGE W. SIWINSKI
BY
ATTORNEY United States Patent Office 3,043,666
Patented July 10, 1962

3,043,666
PURIFICATION OF HYDROGEN PEROXIDE
George W. Siwinski, North Tonawanda, N.Y., assignor to FMC Corporation, a corporation of Delaware
Filed Mar. 11, 1960, Ser. No. 14,412
7 Claims. (Cl. 23—207)

This invention relates to the production of hydrogen peroxide by the alternate reduction and oxidation of alkylated anthraquinones, and particularly to an improved process of purifying hydrogen peroxide produced in accordance with that process.

It is known that alkylated anthraquinones and their tetrahydro derivatives can be used as working compounds in a process for producing hydrogen peroxide. In this process, commonly known as the anthraquinone process, the working compound is dissolved in a suitable solvent or solvent mixture, and is alternately reduced and oxidized to produce hydrogen peroxide. The hydrogen peroxide product, which is derived from the oxidation step, is removed from the working solution with water. The general operation of this process is described in United States Patent Nos. 2,158,525 and 2,215,883.

While the anthraquinone process is desirable for economic and other reasons, the hydrogen peroxide which is produced by it characteristically contains organic impurities such as entrained working solution, dissolved anthraquinones, and anthraquinone degradation products. These impurities tend to impart an undesirable color to the peroxide product. This color renders the peroxide unsuited to applications which require the use of substantially color-free hydrogen peroxide, for example, the preparation of epoxy-containing plasticizers, cosmetic products, and the like.

Heretofore, a conventional method for removing impurities from aqueous hydrogen peroxide produced by the anthraquinone process has been to pass the aqueous solution of hydrogen peroxide through a series of washing or extracting elements known in the art as decolorizers, and then to recover and distill the peroxide solution. These decolorizers are packed columns in which the aqueous hydrogen peroxide is contacted with a solvent which is useful in dissolving alkylated anthraquinones. Solvents of this type are referred to in the art as quinone solvents; typical quinone solvents have been described in United States Patent Nos. 2,768,065 and 2,768,066. Other purification systems employing adsorbing solids such as solid polyethylene in place of the decolorizers are also known. Such units also remove substantial amounts of organic impurities from the aqueous hydrogen peroxide solution, and are followed by a distillation to further purify and concentrate the hydrogen peroxide.

While such purification methods produce substantially water-white hydrogen peroxide, the product on prolonged storage develops an undesirable color which becomes increasingly deeper as the storage time increases. This results in a competitive disadvantage for anthraquinone-produced hydrogen peroxide versus hydrogen peroxide produced by the electrolytic method. Repeated extractions and distillations have not eliminated this coloring of anthraquinone-process hydrogen peroxide upon standing.

It is an object of this invention to produce an aqueous anthraquinone-process hydrogen peroxide product which is color-free, and which does not discolor on aging.

It is a further object of this invention to produce such a color-free and discoloration-resistant aqueous hydrogen peroxide product without destroying any substantial portion of the peroxide recovered.

It has now been surprisingly found that color-forming impurities can be removed in one rapid operation by inserting intermediate the primary separation step and the final distillation, the step of heating the primarily-treated hydrogen peroxide in the presence of a stabilizer for a period of time which is short relative to the time required for discoloration in storage, yet which suffices to convert the impurities into forms which can be removed by conventional means; this heating step can be unexpectedly carried out without any substantial loss of hydrogen peroxide. It has further been determined that the resultant conversion products of the impurities surprisingly can only be removed from the hydrogen peroxide by a separate, solvent extraction step succeeding this heating step and followed by a final distillation.

More specifically, the preferred embodiment of the present process comprises initially solvent extracting the aqueous hydrogen peroxide to remove entrained working solution, heating the resultant raffinate in the presence of a stabilizer until it becomes sufficiently colored to indicate the conversion of the color-forming impurities into other forms, solvent extracting the digested solution to remove part of the converted impurities, distilling the resultant raffinate to remove volatiles and the remaining converted impurities, and recovering the purified hydrogen peroxide solution as bottoms.

These changes in color of anthraquinone-process hydrogen peroxide are believed to be due to colorless organic materials which remain in the peroxide following the extraction step; these materials remain in the hydrogen peroxide even after distillation, and revert in progressive stages to colored impurities upon prolonged storage. However, upon being treated in the present heating (digestion) operation, they are converted into a form in which they can be separated from the hydrogen peroxide by solvent extraction and distillation. These particular organic materials are believed to be quinones which are either hydrolyzed or oxidized, and other degraded products of anthraquinone. However, regardless of the accuracy of this understanding, the present treatment of aqueous hydrogen peroxide from the anthraquinone process provides a hydrogen peroxide product having substantially no color and which remains substantially free of color upon aging.

In the broad concept of the present invention, purification of aqueous hydrogen peroxide solution produced by the anthraquinone process is accomplished by initially separating the aqueous hydrogen peroxide from the organic impurities using solvent extraction, adsorbing beds, or other equivalent means, heating the residual peroxide solution in a digestion zone to a temperature of about 150° to 50° C. for about 1 to 10 hours to effect the desired conversion, thereafter extracting the treated solution with a quinone solvent in a secondary extraction zone at a temperature of about 10° to 60° C., and finally distilling the treated hydrogen peroxide solution. The recovered aqueous hydrogen peroxide solution is substantially free of color, and remains substantially color-free upon prolonged storage. Anthraquinone-process hydrogen peroxide purified by the present process is competitive in color with peroxide produced by prior-art electrolytic methods, and finds application in processes and products in which color is an important consideration.

The starting material for the present process is a crude aqueous hydrogen peroxide, typically containing about 10% to 30% weight of hydrogen peroxide in water, which is obtained from the conventional anthraquinone process. In a preferred embodiment of the invention, this solution is first extracted with a quinone solvent in a primary extraction zone which comprises from one to four, and preferably from two to four, extraction towers connected in series and maintained at a temperature of about 10° to about 60° C. The contact time between the aqueous hydrogen peroxide and the quinone solvent in the extraction zone may vary from 0.1 to 10 hours. One important factor is that the contact time should be sufficient to assure efficient mass transfer between the peroxide solution and the quinone solvent. Thus, the time of contact is dependent on the amount and efficiency of the packing used in the extraction equipment. Additionally, for a given extraction system, there is an inverse relationship between time and temperature, with times near the lower end of the above time range being suitable when the operation is conducted at a temperature approaching 60° C., and times near the upper end of the above time range being desirable when the operation is conducted at temperatures approaching 10° C.

The extraction towers, which comprise the extraction zone, are suitably packed towers which provide good mass transfer between the aqueous solution of hydrogen peroxide and the quinone solvent. The aqueous hydrogen peroxide solution is recovered as raffinate free of residual alkylated anthraquinone and any other portions of the work solution initially entrained in the aqueous hydrogen peroxide. The recovered raffinate has an anthraquinone concentration below 10 parts per million; this represents a removal of over 90% of the anthraquinone present in the crude aqueous hydrogen peroxide solution. The recovered raffinate likewise has a reduced color value; namely, on the order of about 2 on the ferric chloride scale.

The ferric chloride scale is a color index used to indicate the color of the peroxide solution. The solution is visually compared with a series of standard ferric chloride solutions in standard 50 ml. tall form Nessler tubes. The solutions are made up by adding quantities of a ⅙ molar ferric chloride ($FeCl_3.6H_2O$) solution into 50 ml. Nessler tubes and diluting with water to 50 ml.; they are numbered from 0 to 10, with the lower numbered solution being lighter color. The solution numbered 0 is made up by adding 0.1 ml. of the ⅙ molar ferric chloride solution, and 0.2 ml. increments are added for each succeeding higher-numbered solution. Thus solution 10 ultimately contains 2.1 ml. of the ⅙ molar ferric chloride solution diluted with water to 50 ml.

The aqueous hydrogen peroxide raffinate obtained from the primary extraction zone is then heated in a digestion zone. The digestion step comprises maintaining the solution at a temperature of about 150° to 50° C., and preferably at about 100° to 80° C., for a time sufficient to obtain the desired color conversion in the solution, usually about 1 to 10 hours. The digestion step converts color formers, which are virtually colorless organic impurities in the peroxide obtained from the anthraquinone process and which are not removed by simple extraction and distillation, to either alkylated anthraquinones or to other colored impurities. That is, the color formers are either converted to relatively non-volatile colored impurities, or are converted back to the original alkylated anthraquinone. In any event, the digestion converts substantially all of the color formers in solution to other materials. During the digestion operation the color of the peroxide solution is substantially increased, preferably to its maximum color value of about 6 to 10 on the ferric chloride scale, and the digestion is preferably controlled by determining this increase in color, since it indicates when complete conversion of the color-forming impurities has occurred.

The aqueous hydrogen peroxide solution, which now contains anthraquinones and other colored impurities, is treated in a second extraction zone. The conditions under which this operation is conducted are preferably those recited for operation of the primary extraction zone although the two steps need not be conducted under the same conditions in a given purification operation. The quinone solvent employed in the extraction removes the newly formed alkylated anthraquinone. The raffinate peroxide solution, which is now free of anthraquinone, is then passed into a fractionator, where pure aqueous peroxide is separated from the relatively non-volatile colored impurities. The peroxide product has a color value of close to 0 on the ferric chloride scale, and does not increase above a value of about 0.5 when heated or upon prolonged storage. This color is too faint to be observable by the naked eye, and is of the same order of magnitude as that of electrolytically-produced hydrogen peroxide, which reaches a maximum value of about 0 to 1.

The quinone solvents which are suitable as extracting media in the extraction zones include toluene, alkylated naphthalene, mixtures of alkylated naphthalenes and paraffins, chlorinated aromatics such as dichlorobenzene and trichlorobenzene, chlorinated alkanes, e.g. trichloromethane, tetrachloromethane, dichloromethane, and trichloroethane.

The primary and secondary extraction zones operate at atmospheric, or superatmospheric pressures. However, operation at atmospheric pressure is preferred. The digestion may be operated at either subatmospheric, superatmospheric, or atmospheric pressure. However, open vessels operating at atmospheric pressure are preferred for the digestion operation.

It has been found that when the digestion operation is conducted at temperatures near the upper end of the temperature range, and for long times, substantial amounts of hydrogen peroxide may be decomposed. Since it is desirable to hold the decomposition of peroxide to a minimum, it has been found advantageous to employ a typical stabilizer for hydrogen peroxide such as sodium stannate, dipicolinic acid, and the like, in amounts of 1 to 10 parts per million during the digestion. This stabilizer holds the decomposition of the product to a minimum, usually to less than 1% to 5%. In this connection, if the digestion step is permitted to proceed for a period of time beyond the point of maximum color formation, particularly without a stabilizer, the colored impurities will react with peroxide resulting in peroxide losses of up to about 25%. However, when a stabilizer of the above type is employed, and the period of digestion is controlled so that maximum color is produced without excessive digestion, peroxide losses normally are maintained at less than about 5% of the total peroxide present.

As an additional embodiment of the present invention, it has been found that if the purified hydrogen peroxide solution is desired in a particularly color-free condition, and must remain so upon standing, completely color-free peroxide may be obtained by heating the purified solution of aqueous hydrogen peroxide for a period of about 30 minutes at about 100° C. following the fractionization operation. This additional treatment preferably is performed in the presence of a stabilizer such as the above-mentioned sodium stannate stabilizer, in concentrations of about 1 to 10 parts per million. Alternately, treatment for as long as 1 hour at a temperature as low as about 70° C. has been found effective in removing the final traces of color and potential color from the hydrogen peroxide. The added stabilizer prevents substantial destruction of hydrogen peroxide during this additional treatment.

The invention will now be described with reference to the attached drawing which is a schematic flow sheet of the process. In the operation of the process, a working solution of anthraquinone and hydrogen peroxide enters peroxide removal tower 10 through line 12, while water enters the top of the tower through 16. The aqueous extract of hydrogen peroxide is removed through line 18 and passed into primary extractor 22. The working solution, substantially free of hydrogen peroxide, is removed from tower 10 through overhead line 14 and recycled back to the anthraquinone hydrogenator, not shown. A quinone solvent enters primary extractors 22 and 40 through lines 30, 26 and 28, and extracts anthraquinone from the peroxide solution. Columns 22 and 40 are primary extraction towers having conventional packing. If desired, the quinone solvent may be passed through the extractors in series rather than in parallel flow as shown. The extract phases of primary extractors 22 and 40 are removed through line 38 from lines 32 and 36. The hydrogen peroxide raffinate from extractor 22 passes into extractor 40 through lines 24 and 34, for an additional extraction step. Additional primary extractors may be employed, if desired. The raffinate from extractor 40 then enters digester 50 through lines 42 and 44.

The aqueous peroxide solution, which is substantially free of alkylated anthraquinone, is heated in digester 50 by heating means 54. A stabilizer is added to the hydrogen peroxide solution in digester 50, from container 46 through line 48. The hydrogen peroxide solution is then passed in series through lines 52 and 56 to digester 58, then through lines 60, 64 into digester 66, each of these digesters having heating means 62 and 70 respectively. Additional digesters may be employed in the process, but three have been found sufficient to prevent any undesirable backmixing. If less than three digesters are used, backmixing hampers efficient digestion. The peroxide solution is preferably held in the digesters until it reaches its maximum color in the last digester 66, indicating complete conversion of the color-forming impurities.

The digested peroxide solution, by virtue of the digestion step, is purified of color formers, leaving anthraquinone and colored impurities as the remaining contaminants. This solution is then passed from digester 66 to a secondary extractor 74 through lines 68 and 72, and thereafter to another secondary extractor 88 through lines 76 and 86. These secondary columns 74 and 88 are extraction columns of the same kind as the primary extraction towers. Two or more extraction towers may be employed in this secondary extraction step. A quinone solvent flows into extractors 74 and 88 through lines 78, 80 and 82, in the same manner as the primary digesters. The raffinate from secondary extractor 88 then enters heater 96 through line 94. The hydrogen peroxide, water and other volatiles are vaporized in heater 96, and flow through line 98 into a separating zone 100. Entrained non-volatiles are separated in zone 100, and returned to heater 96 through line 104. Relatively high boiling compounds such as colored impurities are removed through line 106 from heater 96. The volatile compounds pass from separator 100 to a fractionator 108 through line 102. This fractionator may be packed with any conventional separating devices, i.e. bubble plates or packing. In the fractionator 108, an aqueous hydrogen peroxide solution is recovered as residue from line 118, while some water and low boilers are removed overhead through lines 110, 114, and 116, after being condensed in cooler 112.

When it is required that hydrogen peroxide be particularly color free, even upon prolonged storage, the final traces of color and potential color may be removed by additionally purifying the recovered hydrogen peroxide from fractionator 108 in heating chamber 120. The purified hydrogen peroxide from fractionator 108 is introduced by line 118 into heating chamber 120. A stabilizer is added during this treatment from container 122, through line 124 into chamber 120. The additionally treated hydrogen peroxide is then removed as finished product through outlet 126.

The following examples are presented as illustrative of the present process, and are not intended to limit the scope of the present process.

EXAMPLE 1

Production of Hydrogen Peroxide

A working solvent, containing 4730 grams of dimethyl naphthalene and 3250 grams of trioctylphosphate, was mixed with 1270 grams of 2-ethylanthraquinone. This solution was hydrogenated at 40° C. by contacting it with hydrogen in a fixed catalytic bed employing palladium on dolomite as a catalyst at 30 p.s.i.a.

During a period of 10 minutes, 80.4 liters of hydrogen gas, measured at 25° C. and 750 mm. of mercury pressure, was absorbed. The solution was then placed in an oxidizing chamber, and contacted with air at a temperature of 36° C. for 70 minutes at 30 p.s.i.a. The quantity of oxygen consumed was 79.9 liters, measured at 25° C. and 750 mm. of Hg. The hydrogen peroxide was then extracted by washing the treated working solution with 100 cc. of water four successive times, in an extraction chamber.

EXAMPLE 2

Prior Art Procedure

An aqueous solution containing 20.4% by weight hydrogen peroxide was obtained from the aqueous extractor of Example 1. Five hundred cubic centimeters of the aqueous peroxide solution were passed through two primary extraction columns connected in series in which a solvent comprising 50% dimethyl naphthalene and 50% kerosene was passed in countercurrent to the hydrogen peroxide solution. The columns were maintained at atmospheric pressure and at a temperature of 40 C. The aqueous peroxide and solvent were passed countercurrently through the column at a rate of 100 cc. per minute and 0.1 cc. per minute respectively. The time of contact between the peroxide solution and the solvent was 10 minutes in each column. The hydrogen peroxide solution recovered as raffinate from the second extractor was then passed into a preheater and separator and thereafter into a distillation column. The bottom and overhead temperatures of the column were maintained at 48° C. and 35° C. respectively, and the pressure of the column at the heater was maintained at 60 mm. Hg absolute. Colored impurities were recovered from the preheater while an aqueous solution of hydrogen peroxide, having a concentration of 50% was recovered as bottoms from the fractionator. It had a color value of 2 on the ferric chloride scale. Upon standing for 30 days at a temperature of 20° C., it had a color value of 4 on the ferric chloride scale.

EXAMPLE 3

Prior Art Procedure With Digestion Step Alone Added

An aqueous solution containing 20.4% by weight hydrogen peroxide was obtained from the aqueous extractor of Example 1. Five hundred cubic centimeters of the aqueous peroxide solution were passed through two primary extraction columns connected in series which were equivalent to those employed in Example 2. A solvent comprising 50% dimethyl naphthalene and 50% kerosene was passed in countercurrent to the hydrogen peroxide solution. The columns were maintained at atmospheric pressure and at a temperature of 40° C. The aqueous peroxide and solvent were passed countercurrently through the column at a rate of 100 cc. per minute, and 0.1 cc. per minute, respectively. The time of contact between the peroxide solution and the solvent was 10 minutes in each column. The raffinate from the second primary extractor was then passed into the first of a series of three digesting tanks. These digesters were maintained at a temperature of 95° C., and at atmospheric pressure. The peroxide solution was digested for a total period of 90 minutes until a maximum color of 6 on the ferric chloride scale was obtained. The digested peroxide solution was then passed into a preheater and separator and thereafter into a distillation column. The bottom and overhead temperatures of the column were maintained at 48° C. and 35° C., respectively, and the pressure of the columns was maintained at 60 mm. Hg absolute. Colored impurities were recovered from the preheater while an aqueous solution of hydrogen peroxide, having a concentration of 50%, was recovered as bottoms from the fractionator. It had a color value of 1.5 on the ferric chloride scale. Upon standing for 30 days at a temperature of 20° C., it had a color value of 3 on the ferric chloride scale.

EXAMPLE 4

Prior Art Procedure Using Exhaustive Extraction

An aqueous solution containing 20.4% by weight hydrogen peroxide was obtained from the aqueous extractor of Example 1. Five hundred cubic centimeters of the aqueous peroxide solution were passed through two primary extraction columns connected in series which were equivalent to those employed in Example 2. A solvent comprising 50% dimethyl naphthalene and 50% kerosene was passed in countercurrent to the hydrogen peroxide solution. The columns were maintained at atmospheric pressure and at a temperature of 40° C. The aqueous peroxide and solvent were passed countercurrently through the column at a rate of 100 cc. per minute and 0.1 cc. per minute, respectively. The time of contact between the peroxide solution and the solvent was 10 minutes. The raffinate from the second primary extractor was then passed into a pair of secondary extractors operated under the same conditions as were used in the primary extractors and using the same solvent as that employed in the primary extractors. The hydrogen peroxide solution recovered as raffinate was then passed into a preheater and separator and thereafter into a distillation column. The bottom and overhead temperatures of the column were maintained at 48° C. and 35° C., respectively, and the pressure of the column was maintained at 60 mm. Hg absolute. Colored impurities were recovered from the preheater while an aqueous solution of hydrogen peroxide, having a concentration of 50%, was recovered as bottoms from the fractionator. It had a color value of 2 on the ferric chloride scale. Upon standing for 30 days at a temperature of 20° C., it had a color value of 4 on the ferric chloride scale.

EXAMPLE 5

Procedure of the Invention

An aqueous solution of 20.4% by weight hydrogen peroxide was obtained from the aqueous extractor of Example 1. Five hundred cubic centimeter samples of the aqueous peroxide solution were passed through two packed columns connected in series which were equivalent to those employed in Example 2. The aqueous peroxide solutions were extracted for the various time periods and by solvents listed in Table I. The columns were maintained at atmospheric pressure and at a temperature of 40° C. The aqueous peroxide and solvent were passed countercurrently through the column at a rate of 100 cc. per minute and 0.1 cc. per minute, respectively. The extracted samples were then digested in a series of three digesting tanks, each maintained at atmospheric pressure for the time and at the temperatures listed in Table I. The total time of digestion for the samples is given in Table I. The color values of the samples after digestion were measured on the ferric chloride scale, and are tabulated in Table I. The digested samples were then subjected to a second extraction for the various time periods and by the solvents listed in Table I. These extractions were performed by contacting the hydrogen peroxide solutions in two columns operating under the same conditions as were used in the primary extractors. The hydrogen peroxide solutions recovered as raffinate, were then passed into a preheater and separator and thence into a distillation column. The bottom and overhead temperatures of the column were maintained at 52° C. and 35° C. respectively, at a pressure of 60 mm. Hg. absolute. Colored impurities were removed from the preheater, while aqueous hydrogen peroxide solutions having concentrations listed in Table I were recovered as bottoms from the fractionator. The color values of the distilled samples, as measured on the ferric chloride scale are given in Table I. Upon aging for 30 days at a temperature of 20° C., the samples gave the color values listed in Table I, when measured on the ferric chloride scale.

TABLE I

| Sample | Two Stage Primary Extraction | | Digestion [1] | | Color | Two Stage Second Extraction | | Color | Conc. H2O2 after Dist., Percent | Color after— | | Peroxide Losses in Digestion, Percent |
|---|---|---|---|---|---|---|---|---|---|---|---|---|
| | Time, Min./Stage | Solvent | Temp., °C. | Time, Min. | | Time, Min./Stage | Solvent | | | Dist. | Aging | |
| 1 | 10 | 50% Dimethyl Naphthalene, 50% Kerosene. | 95 | 90 | 6 | 10 | 50% Dimethyl Naphthalene, 50% Kerosene. | 3 | 50 | 1 | 0.5 | 2 |
| 2 | 10 | Toluene | 95 | 90 | 4 | 10 | Toluene | 2 | 50 | 0.5 | 0.3 | 2 |
| 3 | 10 | Dichlorobenzene | 95 | 90 | 4 | 10 | Dichlorobenzene | 2 | 50 | 0.5 | 0.3 | 2 |
| 4 | 10 | 50% Dimethyl Naphthalene, 50% Kerosene. | 95 | 30 | 4 | 10 | 50% Dimethyl Naphthalene, 50% Kerosene. | 3 | 50 | 1 | 1.5 | 2 |
| 5 | 10 | ___do___ | 95 | 180 | 4 | 10 | ___do___ | 3 | 50 | 1 | 0.5 | 3 |
| 6 | 10 | ___do___ | 95 | [2] 180 | 3 | 10 | ___do___ | 2 | 50 | 1 | 0.5 | 10 |

[1] Stabilizer added—4 mg. per liter of sodium stannate trihydrate in all cases except Run 6.
[2] No stabilizer.

EXAMPLE 6

Procedure of the Invention Including an Additional Purifying Stage

An aqueous solution of 20.4% by weight hydrogen peroxide was obtained from the aqueous extractor of Example 1. Five hundred cubic centimeter samples of the aqueous peroxide solution were passed through two packed columns connected in series which were equivalent to those employed in Example 2. The aqueous peroxide solutions were extracted for the various time periods and by the solvents listed in Table II. The columns were maintained at atmospheric pressure and at a temperature of 40° C. The aqueous peroxide and solvent were passed countercurrently through the column at a rate of 100 cc. per minute and 0.1 cc. per minute respectively. The extracted samples were then digested in a series of three digesting tanks, each maintained at atmospheric pressure for the time and at the temperatures listed in Table II. The total time of digestion for the samples is given in Table II. The color values of the samples after digestion were measured on the ferric chloride scale, and are tabulated in Table II. The digested samples were then subjected to a second extraction for the various time periods and by the solvents listed in Table II. These extractions were performed by contacting the hydrogen peroxide solution in two columns operating under the same conditions as were used in the primary extractors. The hydrogen peroxide solutions recovered as raffinate, were then passed into a preheater and separator and thence into a distillation column. The bottom and overhead temperatures of the column were maintained at 52° C. and 35° C. respectively, at a pressure of 60 mm. Hg absolute. Colored impurities were removed from the preheater, while aqueous hydrogen peroxide solutions having concentrations listed in Table II were recovered as bottoms from the fractionator. The color values of the distilled samples, as measured on the ferric chloride scale, are listed in Table II. These bottoms were then passed into a heating chamber and maintained at a temperature of 95° C. for 30 minutes. The hydrogen peroxide solutions removed from the heating chamber had color values listed in Table II on the ferric chloride scale. Upon aging for 30 days at a temperature of 20° C., they had the color values listed in Table II as measured on the ferric chloride scale.

EXAMPLE 7

*Procedure of the Invention Using a Polyethylene Adsorbing Bed*

The procedure of Example 5, sample 1, was repeated except that a polyethylene adsorbing bed was employed in place of the primary extraction columns. The results obtained were identical to those of Example 5, sample 1.

trates the necessity for a digestion step in the purification process.

The results of Examples 2 to 4, shown in Table III, clearly indicate that these procedures are not suitable for purifying the hydrogen peroxide solution. Only the combined steps of an initial separation of the aqueous peroxide, a digestion, a solvent extraction, and a final distillation, as performed in Examples 5, 6 and 7 are sufficient to remove the impurities which color the hydrogen peroxide upon standing.

The advisability of employing a stabilizer during the purification process is demonstrated in Example 5, samples 5 and 6. These samples were purified under identical conditions in accordance with the present process, except that no stabilizer was used in sample 6. The undesirable loss of hydrogen peroxide during the purification amounted to 10% in nonstabilized sample 6 compared to a 3% loss for stabilized sample 5. This clearly

TABLE II

| Sample | Two Stage Primary Extraction | | Digestion | | Color | Two Stage Second Extraction | | Color | Conc. $H_2O_2$ after Dist., percent | Color after Dist. | Additional Heating | | Color after— | |
|---|---|---|---|---|---|---|---|---|---|---|---|---|---|---|
| | Time, Min./Stage | Solvent | Temp., °C. | Time, Min. | | Time, Min./Stage | Solvent | | | | Temp., °C. | Time, Min. | Heating | Aging |
| 1 | 10 | 50% Dimethyl Naphthalene, 50% Kerosene. | 95 | 90 | 6 | 10 | 50% Dimethyl Naphthalene, 50% Kerosene. | 3 | 50 | 1 | 95 | 30 | 0 | 0 |
| 2 | 10 | Toluene | 95 | 90 | 4 | 10 | Toluene | 2 | 50 | 0.5 | 95 | 30 | 0 | 0 |
| 3 | 10 | Dichlorobenzene. | 95 | 90 | 4 | 10 | Dichlorobenzene. | 2 | 50 | 0.5 | 95 | 30 | 0 | 0 |

TABLE III.—COLORS OF HYDROGEN PEROXIDE PRODUCTS OF EXAMPLES 1 TO 7

| | Initial (as Recovered) | After Aging |
|---|---|---|
| Example 2—Prior Art Procedure | 2 | 4 |
| Example 3—Prior Art Procedure with Digestion Step Alone Added | 1.5 | 3 |
| Example 4—Prior Art Procedure Using Exhaustive Extraction | 2 | 4 |
| Example 5—Procedure of the Invention— Sample: | | |
| 1 | 1 | 0.5 |
| 2 | 0.5 | 0.3 |
| 3 | 0.5 | 0.3 |
| 4 | 1 | 1.5 |
| 5 | 1 | 0.5 |
| 6 | 1 | 0.5 |
| Example 6—Procedure of the Invention Including an Additional Purifying Stage— Sample: | | |
| 1 | 1 | 0 |
| 2 | 0.5 | 0 |
| 3 | 0.5 | 0 |
| Example 7—Procedure of the Invention Using a Polyethylene Adsorbing Bed | 1 | 0.5 |

The final color values of the hydrogen peroxide solution produced by the processes of Examples 2 to 7 are listed in Table III. These results clearly indicate that the prior art procedure, as exemplified by Example 2 wherein only an extraction and a distillation are employed alone, does not sufficiently remove color formers from anthraquinone-process hydrogen peroxide.

In the method demonstrated by Example 3, the hydrogen peroxide is treated in an initial extraction step followed by a digestion step and a subsequent distillation. In this example, a secondary extraction step has been omitted after the initial digestion step with the result that anthraquinone, which has newly been formed from the digestion step, is not removed and is converted to color impurities. This demonstrates the necessity for employing a second extraction step after the digestion step.

Further, when the method of Example 4 is employed using only exhaustive extraction and a subsequent distillation, this is not sufficient to remove the impurities as indicated by the color values of Table III. This illustrates the effectiveness of a stabilizer during the instant purification process.

The improved results of employing a second treating step for the purified peroxide solution are shown by Example 6. The tabulated results of the examples given in Table III show that an extremely color-free product may be obtained, even after storage, when hydrogen peroxide solutions are additionally purified by this secondary treatment.

The results obtained in the above examples are typical of those obtained when hydrogen peroxide, which is produced in accordance with the anthraquinone process employing a variety of alkylated anthraquinones and their tetrahydro derivatives in a variety of working solvents, is purified by the present process.

Pursuant to the requirements of the patent statutes, the principle of this invention has been explained and exemplified in a manner so that it can be readily practiced by those skilled in the art, such exemplification including what is considered to represent the best embodiment of the invention. However, it should be clearly understood that, within the scope of the appended claims, the invention may be practiced by those skilled in the art, and having the benefit of this disclosure, otherwise than as specifically described and exemplified herein.

What is claimed is:

1. In the cyclic process of producing hydrogen peroxide by hydrogenating an alkylated anthraquinone carried in a working solvent for said anthraquinone and its corresponding anthrahydroquinone to obtain the corresponding alkylated anthrahydroquinone, oxidizing said alkylated anthrahydroquinone to produce hydrogen peroxide and reform said alkylated anthraquinone, and extracting said hydrogen peroxide with water from said alkylated anthraquinone and said solvent in a water extraction zone, the improvement which comprises separating the recovered aqueous hydrogen peroxide solution in an initial purifying zone from entrained working solution and alkylated anthraquinone present in said aqueous hydrogen peroxide solution, passing said aqueous hydrogen peroxide solution from said initial purifying zone to a digestion zone, maintaining said solution in the presence of a stabilizer for hydrogen peroxide in said digestion zone at a temperature between 150° and 50° C. for a period of 1 to 10 hours to substantially increase the color of said solution without substantial loss of hydrogen peroxide, withdrawing digested aqueous hydrogen peroxide solution from said digestion zone and contacting it with a solvent for alkylated anthraquinone in a solvent extraction zone to remove any alkylated anthraquinone which is now present in said solution, passing said aqueous hydrogen peroxide solution free of alkylated anthraquinone from said solvent extraction zone to a separatory distillation zone, withdrawing vaporized water and low boilers overhead, and withdrawing purified aqueous hydrogen peroxide solution as bottoms from said distillation zone.

2. In the cyclic process of producing hydrogen peroxide by hydrogenating an alkylated anthraquinone carried in a working solvent for said anthraquinone and its corresponding anthrahydroquinone to obtain the corresponding alkylated anthrahydroquinone, oxidizing said alkylated anthrahydroquinone to produce hydrogen peroxide and reform said alkylated anthraquinone, and extracting said hydrogen peroxide with water from said alkylated anthraquinone and said solvent in a water extraction zone, the improvement which comprises contacting the recovered aqueous hydrogen peroxide solution with a solvent for alkylated anthraquinone in a primary solvent extraction zone to remove entrained working solution and alkylated anthraquinone present in said aqueous hydrogen peroxide solution, passing said aqueous hydrogen peroxide solution from said primary solvent extraction zone to a digestion zone, maintaining said solution in the presence of a stabilizer for hydrogen peroxide in said digestion zone at a temperature between 150° and 50° C. for a period of 1 to 10 hours to substantially increase the color of said solution without substantial loss of hydrogen peroxide, withdrawing digested aqueous hydrogen peroxide solution from said digestion zone and contacting it with a solvent for alkylated anthraquinone in a secondary solvent extraction zone to remove any alkylated anthraquinone which is now present in said solution, passing said aqueous hydrogen peroxide solution free of alkylated anthraquinone from said secondary solvent extraction zone to a separatory distillation zone, withdrawing vaporized water and low boilers overhead, and withdrawing purified aqueous hydrogen peroxide solution as bottoms from said separatory distillation zone.

3. The process of claim 2 in which said digestion zone is maintained at a temperature between 100 and 80° C. at about atmospheric pressure for a period of 1 to 2 hours.

4. The process of claim 2 in which said digestion zone is maintained at a temperature of about 90° C., at about atmospheric pressure for a period of 1 to 2 hours.

5. In the cyclic process of producing hydrogen peroxide by hydrogenating an alkylated anthraquinone carried in a working solvent for said anthraquinone and its corresponding anthrahydroquinone to obtain the corresponding alkylated anthrahydroquinone, oxidizing said alkylated anthrahydroquinone to produce hydrogen peroxide and reform said alkylated anthraquinone, and extracting said hydrogen peroxide with water from said solution of alkylated anthraquinone and said solvent in a water extraction zone, the improvement which comprises contacting the recovered aqueous hydrogen peroxide solution with a solvent for alkylated anthraquinone in a primary solvent extraction zone to remove entrained working solution and alkylated anthraquinone present in said aqueous hydrogen peroxide solution, passing said aqueous hydrogen peroxide solution from said primary solvent extraction zone to a digesting zone, maintaining said solution in the presence of a stabilizer for hydrogen peroxide in said initial digestion zones at a temperature between 150° and 50° C. and at a pressure of about 0.5 to 10 atmospheres for a period of 1 to 10 hours to substantially increase the color of said solution without substantial loss of hydrogen peroxide, withdrawing digested aqueous hydrogen peroxide solution from said digestion zones and contacting it with a solvent for alkylated anthraquinone in a secondary solvent extraction zone to remove any alkylated anthraquinone which is now present in said solution, passing said aqueous hydrogen peroxide solution free of alkylated anthraquinone from said secondary solvent extraction zone to a separatory distillation zone, withdrawing vaporized water and low boilers overhead, withdrawing purified aqueous hydrogen peroxide solution as bottoms from said distillation zone, passing said purified aqueous hydrogen peroxide bottoms to a heating zone maintained at a temperature of 100° to 70° C. for a period of 30 to 60 minutes and withdrawing purified aqueous hydrogen peroxide solution from said heating zone.

6. The process of claim 5 in which said digestion zone is maintained at a temperature between 100° and 80° C., at about atmospheric pressure for a period of 1 to 2 hours.

7. The process of claim 5 in which said digestion zone is maintained at a temperature of about 90° C., at about atmospheric pressure for a period of 1 to 2 hours.

References Cited in the file of this patent

Schumb et al.: "Hydrogen Peroxide," Reinhold Publ. Corp., N.Y., 1955, pages 152–159.